United States Patent
Schwab et al.

(10) Patent No.: US 6,626,796 B2
(45) Date of Patent: Sep. 30, 2003

(54) MANOEUVRING MODE OF VEHICLES HAVING AN AUTOMATED CLUTCH

(76) Inventors: Manfred Schwab, c/o ZF Friedrichshafen AG, D-88038 Friedrichshafen (DE); Wilhelm Härdtle, c/o ZF Friedrichshafen AG, D-88038 Friedrichshafen (DE)

( * ) Notice: Subject to any disclaimer, the term of this patent is extended or adjusted under 35 U.S.C. 154(b) by 0 days.

(21) Appl. No.: 10/239,966

(22) PCT Filed: Mar. 29, 2001

(86) PCT No.: PCT/EP01/03586
§ 371 (c)(1),
(2), (4) Date: Sep. 26, 2002

(87) PCT Pub. No.: WO01/74618
PCT Pub. Date: Oct. 11, 2001

(65) Prior Publication Data
US 2003/0092530 A1 May 15, 2003

(30) Foreign Application Priority Data
Apr. 4, 2000 (DE) .......................................... 100 16 582

(51) Int. Cl.⁷ .............................................. B60K 41/02
(52) U.S. Cl. ............................................ 477/74; 477/78
(58) Field of Search ............................... 477/71, 78, 74

(56) References Cited

U.S. PATENT DOCUMENTS

| | | | | |
|---|---|---|---|---|
| 5,293,316 A | * | 3/1994 | Slicker | 477/74 |
| 5,681,242 A | * | 10/1997 | Bates | 477/180 |
| 5,759,131 A | | 6/1998 | Kosik et al. | 477/84 |
| 6,033,340 A | | 3/2000 | Amendt et al. | 477/77 |
| 6,086,508 A | * | 7/2000 | Kosik et al. | 477/74 |
| 6,105,709 A | | 8/2000 | Eckstein et al. | 180/333 |
| 6,113,515 A | | 9/2000 | Salecker et al. | 477/72 |
| 6,302,823 B1 | | 10/2001 | Eckert et al. | 477/186 |
| RE37,572 E | * | 3/2002 | Kremmling et al. | 477/74 |

FOREIGN PATENT DOCUMENTS

| | | | | |
|---|---|---|---|---|
| DE | 32 43 461 A1 | 7/1983 | | B60K/41/06 |
| DE | 33 34 723 A | 4/1985 | | B60K/41/02 |
| DE | 34 21 387 A1 | 12/1985 | | B60K/41/02 |
| DE | 37 24 070 A1 | 2/1989 | | B60K/41/00 |
| DE | 40 02 328 A1 | 8/1990 | | H03K/17/28 |
| DE | 195 30 613 A1 | 2/1997 | | F16D/48/02 |
| DE | 196 25 502 C1 | 11/1997 | | B60K/26/02 |
| DE | 197 16 828 A1 | 11/1997 | | B60K/23/00 |
| DE | 197 21 034 A1 | 11/1997 | | B60K/41/02 |
| DE | 197 53 764 A1 | 6/1999 | | B60K/41/00 |
| EP | 0 731 294 A2 | 9/1996 | | F16H/59/14 |
| FR | 2 764 560 | 12/1998 | | B60K/23/02 |
| JP | 62-71728 A | 9/1987 | | |

* cited by examiner

Primary Examiner—Dirk Wright

(57) ABSTRACT

A motor vehicle (2) has a transmission (6) with an automated clutch (8) with a control device (20), a gas pedal, a brake pedal and an actuating element (28, 30, 32) which is released for activating an inching procedure. In the method for determining a defined inching procedure, time is measured by the actuating element (28, 30, 32) after the inching procedure has been activated and, after a reference value has been exceeded, the inching procedure starts at a predeterminable speed as long as neither the brake pedal nor the gas pedal has been activated.

10 Claims, 4 Drawing Sheets

MANOEUVRING MODE OF VEHICLES HAVING AN AUTOMATED CLUTCH

FIELD OF THE INVENTION

The invention relates to a manoeuvring mode for vehicles with automated clutch.

BACKGROUND OF THE INVENTION

According to the preamble of claim 1 the invention relates to a manoeuvring mode for vehicles with automated clutch.

In vehicle transmissions constructed without a clutch pedal, for many manoeuvring operations it is desirable to leave the right foot upon the brake pedal which is generally used for giving gas and thus for delivering a reference value signal for the torque in order to be able very quickly brake the vehicle in an emergency should a dangerous torque appear.

EP 0 731 294 A2 has disclosed a manoeuvring mode for vehicles with automated transmissions. There it is proposed, depending on an inching mode selected by the driver, to adapt the gas pedal inclination so as to allow, for a corresponding injection amount, a larger actuating angle than in a different driving mode. The vehicle in this mode can be moved at a lower speed under an equal adjustment angle of the gas pedal. The method has the disadvantage that the driver has to leave his right foot upon the gas pedal for determining the manoeuvring speed. In the event of a dangerous torque, he has to change pedals to be able to brake.

The problem on which this invention is based is to outline a method that allows a quick action upon decelerating devices of the vehicle.

The problem is solved by a method having the features stated in claim 1. Developments are object of sub-claims.

SUMMARY OF THE INVENTION

In a method for determining a defined inching procedure of a motor vehicle, the vehicle has an automated clutch with a control device, a gas pedal and a brake pedal, and the vehicle has an actuating element for activating the inching procedure. The time after activation of the inching procedure by the actuating element is measured and compared with a reference value. After exceeding the continues while neither the brake pedal nor the gas pedal is activated. In one embodiment, the activation of the inching procedure is confined to the activated driving steps for the automated forward gear range or the reverse gear range. An elimination of activation of the inching procedure must be avoided especially in the "parking" and "neutral" control positions in order not to allow an unintended release of the vehicle movements. One design of the invention allows activation of the inching procedure only in the activated driving steps for the reverse gear range. In one embodiment, the actuating element is controlled by hand, that is, the driver manually engages the actuating element in the area of the control elements for the vehicle which are located in an area accessible to his hands. But in another embodiment, the actuating element is actuated by the foot which does not actuate the brake pedal. One other embodiment provides that a control element, for a function of the vehicle which constitutes an unnecessary function during the inching procedure, can be used as the actuating element so that hereby an additional actuating element can be spared. As control elements for this, for example, a hand lever for actuating an additional brake device such as a retarder or an engine brake switch actuatable by hand or foot are considered. A combined actuation of several switches can also be used for activating the inching procedure.

In an advantageous embodiment, different fixed manoeuvring speeds are preset in the control device which can be called via the actuating element. In one development of the invention, the manoeuvring speed is selected by determining the time of uninterrupted actuation of the actuating element and coordinating a specific manoeuvring speed with a specific time elapsed and, in another embodiment, the manoeuvring speed is selected by determining the number of actuating operations of the actuating element and coordinating a specific manoeuvring speed with a specific number of actuations. In one advantageous development, the idling speed regulator is engaged, for example, via a vehicle master for correcting the idling rotational speed according to engaged auxiliary consumers which otherwise would lower the idling rotational speed and no longer ensure the desired manoeuvring speed.

In the layout of the possible manoeuvring speeds and also of the period during which said speeds can occur, on the basis of the defined clutch differential speed related to the manoeuvring speed, the load capacity of the clutch has to be kept in mind. To this end can serve a limitation of the maximum torque of the clutch or clutch protection functions must be provided in case of overload of the clutch during protracted operation. When using rotational speed sensors of the vehicle whose minimum detectable rotational speed lies below the rotational speeds achieved in the manoeuvring operation. It is also possible to control the manoeuvring operation by the signals about the existing engine torque which can be read from the injection amount and the knowledge, via engaged auxiliary consumers, the same as the differential rotational speed occurring on the clutch.

BRIEF DESCRIPTION OF THE DRAWINGS

The invention will now be described, by way of example, with reference a to the accompanying drawings in which.

The invention explained in detail with reference to a drawing which shows.

DETAILED DESCRIPTION OF THE INVENTION

Figure 1:
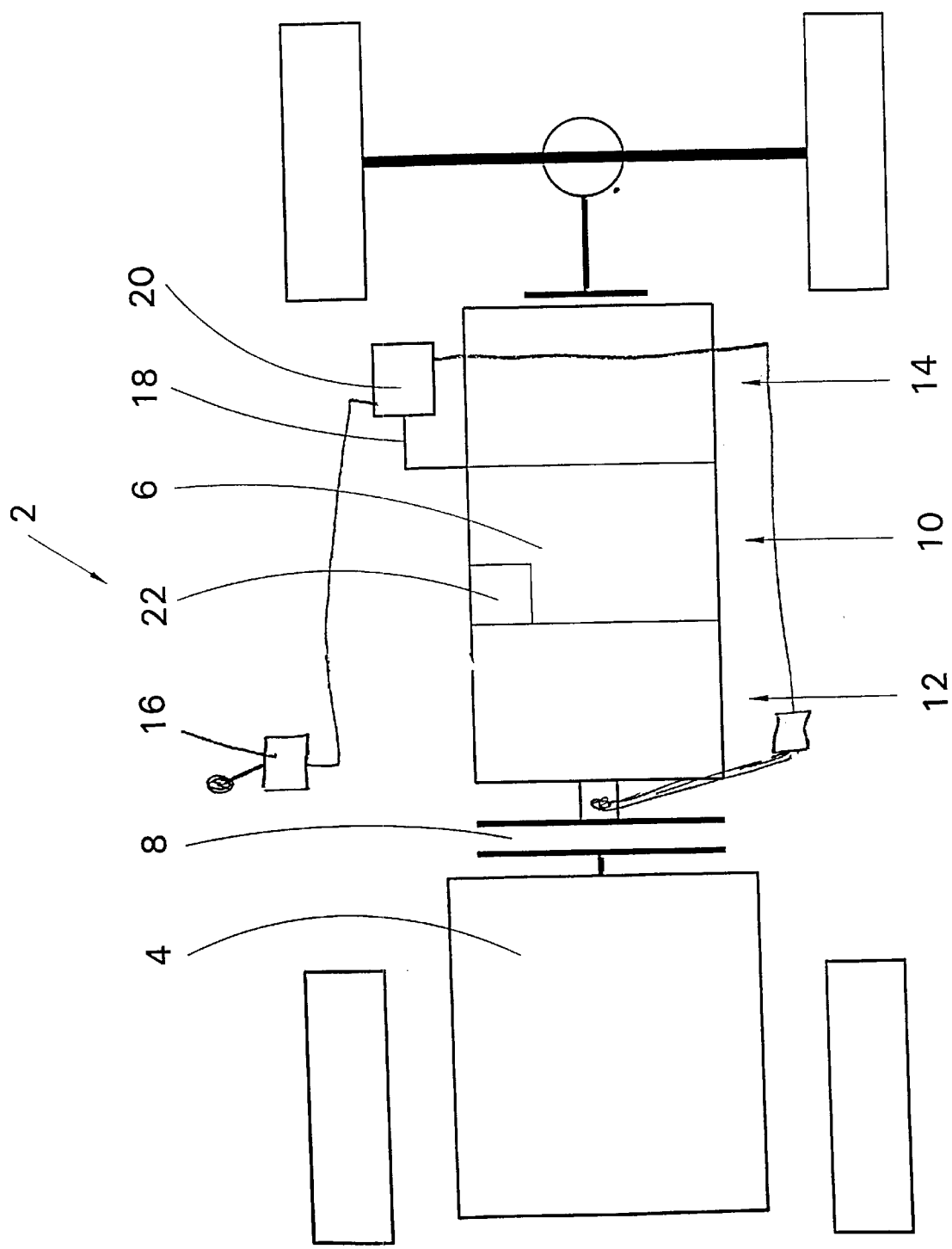
FIG. 1 diagrammatically shows a vehicle with automated transmission.

FIG. 1 shows a vehicle with a primer mover 4, a transmission 6 and a clutch 8 situated therebetween. The transmission 6 has a main part 10, a splitter group transmission 12 and a range change group transmission 14. The transmission 6 is connected by connecting lines 18 with an electronic control device 20. A selector switch 16 is provided for delivering manual engagements of the driver and is connected with the control device 20. The transmission 6 is automatically shifted by an adjusting device 22 according to signals that the adjusting device 22 receives from the control device 20. The clutch adjuster 24 likewise receives signals from the control device 20 and actuates the clutch 8.

Figure 2:
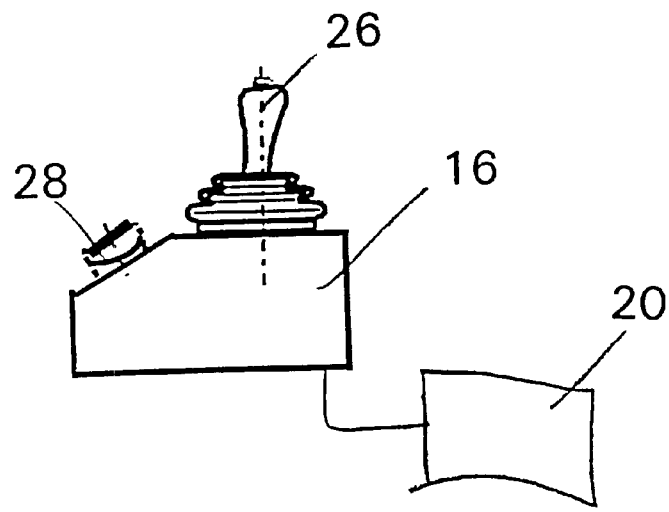
FIG. 2 is a selector switch.
Figure 3:
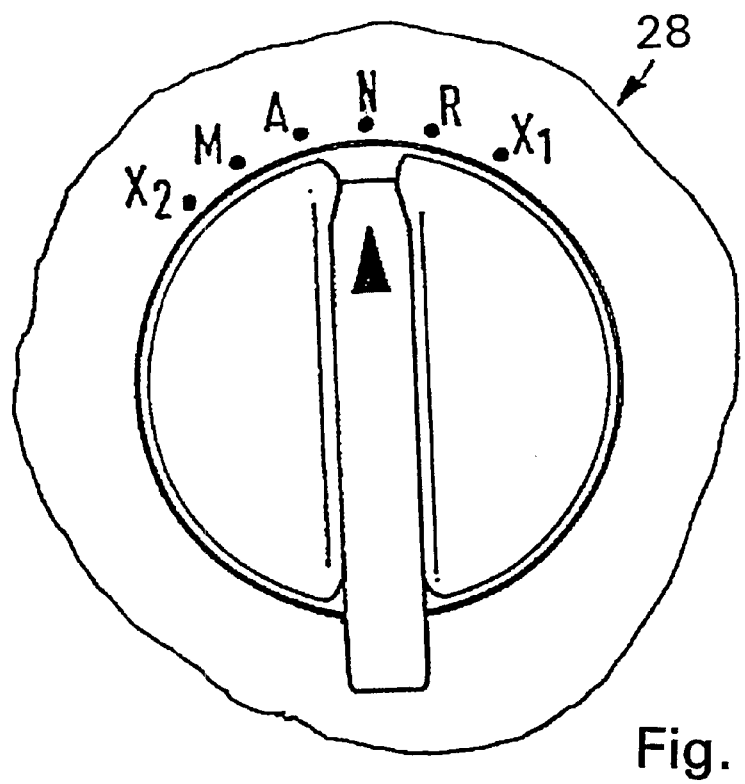
FIG. 3 is a rotary switch on the selector switch.

FIG. 2 shows a selector switch 16 which has a selector lever 26 and a rotary switch 28. The selector switch 16 is connected with the control device 20. In FIG. 3, the rotary switch 28 is shown in more detail. Next to the neutral position "N" is provided a position "R" for the reverse gear range, a position "A" for the automatically engaged forward gear range and a position "M" for the manually engaged forward gear range. The position "X1" represents a position of the rotary switch 28 in which the inching procedure is activated in the reverse gear range and which is logically provided in direction to the position "R" from neutral. The position "X2" represents a position of the rotary switch 28 in which the inching procedure is activated in the forward gear range and which logically is provided in direction to the positions "A" or "M" from neutral.

Figure 4:
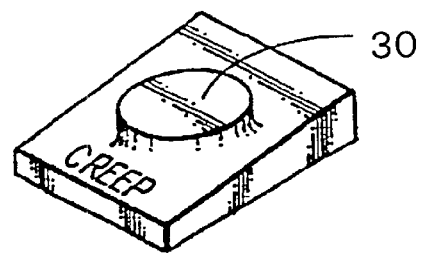
FIG. 4 is one other switch.

FIG. 4 shows a switch 30 which can be situated upon the dashboard of a driver compartment or also on the selector switch 16 and likewise can serve as alternative design for activating the inching procedure.

Figure 5A:
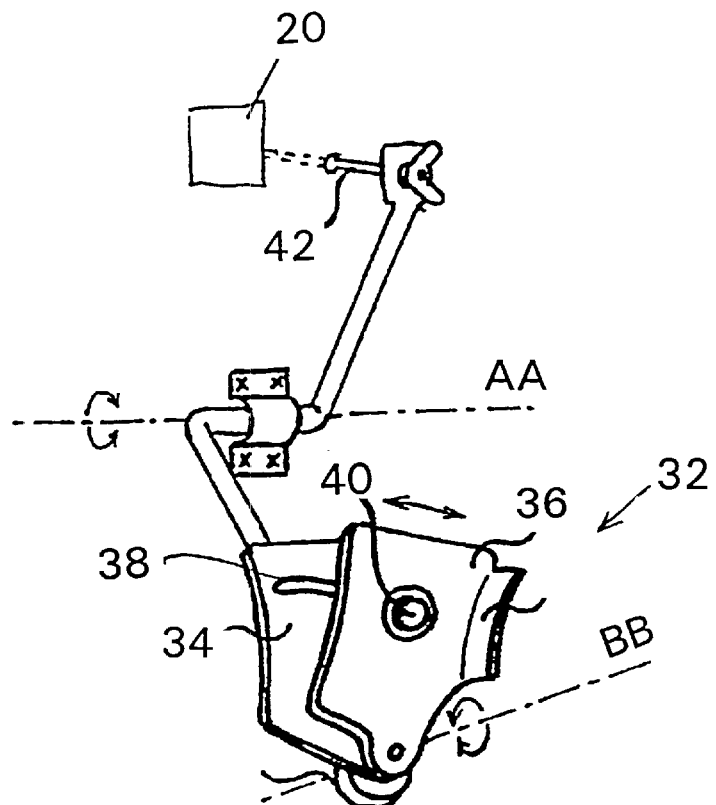
FIGS. 5A and 5B show two embodiments of a switch in the foot area.
Figure 5B:
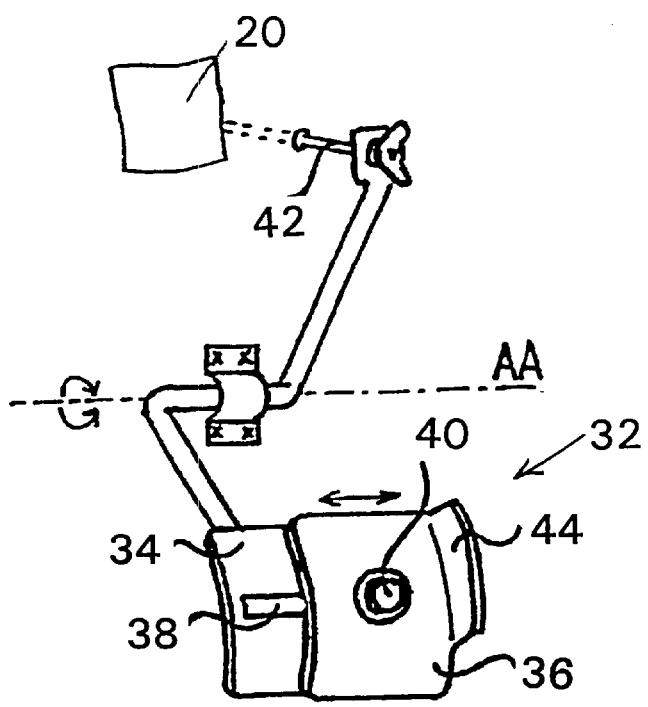

In FIG. 5 is finally shown an alternative for a switch 32 actuated by a foot. The switch 32 is rotatable around an axis AA on the body in the foot space of the driver compartment and comprises a base plate 34 in the form of a foot pedal upon which is situated a plate 36 pivotable around an axis BB. The base plate 34 has a slot 38 in which a pin 40 engages in the plate 36 whereby the deviation path of the plate 36 is limited. The switch 32 is connected with the control device 20 via a connection 42. A stop 44 is provided laterally on the plate 36 against which a shoe edge of the vehicle driver can be pressed. Unlike in FIG. 5A, in FIG. 5B the plate 36 is sidewise displaceable upon the base plate 34, the pin 40, in turn, being passed into the slot 38 thus limiting the path thereof.

Figure 6:
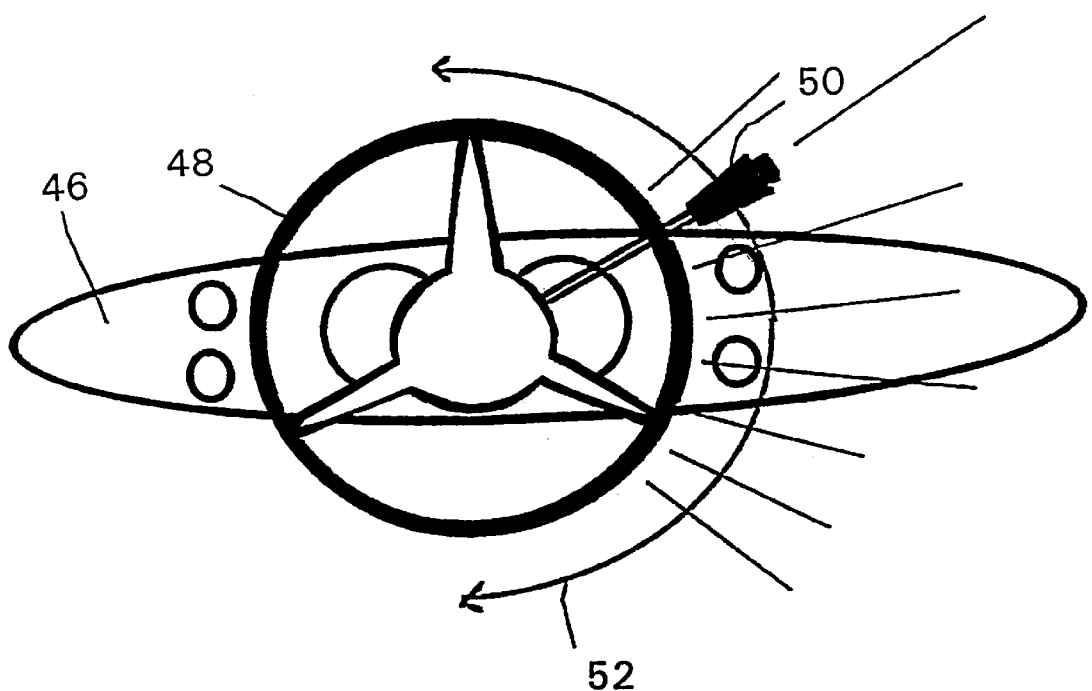
FIG. 6 is one control element for other vehicle functions.

In FIG. 6, a steering wheel 48 is provided on a dashboard 46 of the driver compartment, on which is placed a steering drop arm 50 for control of a retarder. The steering drop arm 50 is adjustable in different positions along a semicircle 52, shown here as lines, through which the different braking steps are controlled. At low speeds the retarder is inactive. Therefore, the control element steering arm drop 50 can be used in this driving situation for activating the inching procedure.

Reference Numerals
2 vehicle 28 rotary switch
4 prime mover 30 switch
6 transmission 32 switch
8 clutch 34 base plate
10 main part of transmission 36 plate
12 split group transmission 38 slot
14 range change group transmission 40 pin
16 selector switch 42 connection
18 connecting line 44 stop
20 control device 46 dashboard
22 adjusting device 48 steering wheel
24 clutch adjuster 50 steering drop arm
26 selector lever 52 semicircle

What is claimed is:

1. A method for determining a defined creeping procedure of a motor vehicle (2) having an automated clutch (8), a control device (20), a gas pedal, a brake pedal and an actuating element (28, 30, 32) which is operated for activating the creeping procedure of the motor, the method comprising the steps of:

measuring a time following activation by the actuating element (28, 30, 32) of the creeping procedure; and after exceeding a reference period of time, starting the creeping procedure at a predeterminable speed and maintaining the creeping procedure at the predeterminable speed unit one of the brake pedal and the gas pedal is activated.

2. The method according to claim 1, further comprising the steps of connecting the automated clutch (8) with an automated transmission (6); and limiting activation of the creeping procedure to activated driving steps for one of an automated forward gear range and an automated reverse gear range.

3. The method according to claim 1, further comprising the step of limiting activation of the creeping procedure to activated driving steps for a reverse gear range.

4. The method according to claim 1, further comprising the step of manually controlling the actuating element (28, 30) to facilitate actuation of the creeping procedure.

5. The method according to claim 1, further comprising the step of using a foot of a driver, which is opposite from a foot of the driver used to operate the brake pedal, to actuate the actuating element (32).

6. The method according to claim 1, further comprising the step of using a control element (50), which is used to control another function not required during the creeping procedure, as the actuating element (28, 30, 32).

7. The method according to claim 1, further comprising the step of presetting different fixed manoeuvring speeds in the control device (20) which can be instituted via actuation of the actuating element (28, 30, 32).

8. The method according to claim 1, further comprising the step of selecting the manoeuvring speed by a duration that the actuating element (28, 30, 32) is uninterrupted.

9. The method according to claim 1, further comprising the step of selecting the manoeuvring speed based upon a number of actuations of the actuating element (28, 30, 32).

10. The method according to claim 1, further comprising the step of correcting, via the control device (20), a signal for an idling speed regulator of the prime mover according to at least one engaged auxiliary consumer device of the vehicle.

* * * * *